United States Patent

[11] 3,620,775

| [72] | Inventors | Mauj A. Cohly<br>Catlin, Ill.;<br>James W. Sanner, Midland, Mich. |
|---|---|---|
| [21] | Appl. No. | 752,077 |
| [22] | Filed | Aug. 12, 1968 |
| [45] | Patented | Nov. 16, 1971 |
| [73] | Assignee | Tee-Pak, Inc.<br>Chicago, Ill. |

[54] EDIBLE COLLAGEN CASING
8 Claims, 4 Drawing Figs.

[52] U.S. Cl. .................................................. 99/176,
264/198, 264/202
[51] Int. Cl. ..................................................... A22c 13/00
[50] Field of Search ........................................... 99/175,
176; 264/198, 202

[56] References Cited
UNITED STATES PATENTS

| 2,637,321 | 5/1953 | Cresswell ...................... | 99/176 |
| 3,123,480 | 3/1964 | Lieberman .................... | 99/176 |
| 3,123,653 | 3/1964 | Lieberman .................... | 99/175 X |
| 3,194,865 | 7/1965 | Fagan ............................ | 99/176 X |
| 3,433,864 | 3/1969 | Highberger .................... | 99/176 X |
| 3,505,084 | 4/1970 | Kidney .......................... | 99/175 |

FOREIGN PATENTS

| 784,235 | 10/1957 | Great Britain | |
| 1,018,911 | 2/1966 | Great Britain ................ | 264/202 |

*Primary Examiner*—Frank W. Lutter
*Assistant Examiner*—Robert Halper
*Attorney*—Neal J. Mosely ABSTRACT: An edible sausage casing having improved stuffing, linking, and cooking characteristics is prepared from hide collagen. Animal hides, either fresh, frozen or salt-cured, limed or unlimed, are swollen and mechanically un-haired and split to produce a collagen-containing corium layer. The coreium is ground into fine particles, formed into a slurry and swollen with weak acid to produce an extrudable collagen paste or slurry, preferably having a solids content of about 2-6 percent. The slurry is extruded through an annular die into a coagulation bath containing ammonium sulfate or sodium sulfate or equivalent coagulant and a small amount of strong alkali, such as sodium hydroxide, sufficient to neutralize completely the acid present in the slurry. The neutralization of the slurry may be partially in the coagulation bath and completed in a subsequent neutralization bath. The neutralization of the slurry hardens the coagulated collagen and avoids the necessity of tanning the extruded collagen casing. The neutralized casing is washed and finally plasticized using an aqueous solution of glycerin, or equivalent plasticizer, preferably containing a small amount of a fatty monoglyceride or an acetylated fatty monoglyceride. The casing is then dried and reeled and eventually shirred on a commercial shirring machine for delivery to the meat packer in shirred form.

MAUJ A COHLY
JAMES W SANNER
*INVENTOR.*

BY
their attorney

EDIBLE COLLAGEN CASING

BACKGROUND OF THE INVENTION

Natural casings are prepared from the intestines of various edible animals, primarily cattle, hogs, and sheep. The intestines are removed from the slaughtered animal and are thoroughly cleaned by processes well known in the art. Natural casings, which have been thoroughly cleaned, are stuffed with various sausage meat compositions and formed into sausage links in preparation for cooking. The sausages which are thus formed are cooked by the consumer and the sausage casings eaten with the cooked sausage. In the preparation of certain smoked or precooked sausages, such as frankfurters and the like, the sausage is cooked or smoked or otherwise processed by the meat packer to render it edible without further treatment by the consumer.

Prior to about 1925, substantially all sausage casings were natural casings prepared from animal intestines. Since that time there have been developed several types of synthetic sausage casings, principally of regenerated cellulose, which are used in the preparation of the major portion of sausages which are made and sold today. Cellulose casings are used in the preparation of large sausages, such as bolognas, salamis, and the like, and are removed from the sausage by the consumer at the time of final preparation for eating. Regenerated cellulose casings are also used in the preparation of frankfurter sausages wherein the casing is stuffed with sausage emulsion, linked, smoke, and cooked, and the casing removed from the finished sausage.

Regenerated cellulose casings have not proven satisfactory for the processing of pork sausage inasmuch as cellulose is not edible with the sausage and does not transmit the fat which is released from the sausage during cooking. As a result there has been some demand for an artificial sausage casing which is edible and which has the properties desired in a casing to be used in the processing of pork sausages.

Over a period of many years, synthetic sausage casings have been prepared from animal collagen. Casings made of collagen have been prepared by processing animal hide to break the collagen into a fibrous structure and extrude the collagen fibers in the form of a doughy mass to produce tubular casings. The casings which have been prepared in this manner have been hardened with formaldehyde and have been used as a removable casing for processing various sausages. These casings have not been edible even though collagen itself is an edible material. More recently, edible sausage casings of collagen have been prepared and sold in commercial quantities. In the manufacture of edible collagen casings, considerable emphasis has been placed on the necessity for using collagen source materials which have not been subjected to a liming treatment. In fact, a number of recent patents describing the production of collagen have indicated that it is absolutely necessary to start with an unlimed collagen source material if an edible casing is to be obtained. While the use of unlimed collagen as a starting material has certain advantages, it has the substantial disadvantage of requiring a more severe mechanical treatment for removal of hair and the epidermal layer from the hides from which the collagen is obtained.

In the copending patent application of Robert D. Talty and Mauj A. Cohly, Ser. No. 442,885 filed Mar. 26, 1965, now U.S. Pat. No. 3,408,918, a process is described in which edible collagen casings are prepared from limed hide collagen. In that process, animal collagen is obtained from limed hides which are subsequently subjected to an acid deliming process. In the copending patent application of Robert D. Talty, Ser. No. 471,645, filed Sept. 13, 1965, now U.S. Pat. No. 3,425,846 a process is described for the preparation of edible collagen casings from limed hides which may be subjected to an acid deliming process or which may be converted directly into a collagen paste and casings formed without the acid deliming step, provided that the collagen is processed into casing at a sufficiently high speed.

In the preparation of edible collagen casings, hide collagen is converted into a finely divided fibrillar form and extruded in the form of a dilute collagen slurry, e.g. 2–6 percent collagen content. The extruded collagen is then passed into an ammonium sulfate and/or sodium sulfate coagulating bath which dehydrates the collagen slurry and forms a coherent collagen film. At this stage in the process, however, the salt-coagulated collagen film can be handled but will revert to a thin slurry upon further contact with water. It is therefore necessary to harden or tan the extruded collagen film to permit further processing of the film and to provide the film with sufficient strength for use as a sausage casing.

A satisfactory tanning process must utilize a tanning agent which is very rapid in tanning action and completely nontoxic in the form in which is present in the finished casing and must produce a casing of sufficient strength to be stuffed with sausage meat, linked, packaged, and finally cooked. In the preparation of edible collagen casings, one satisfactory method of tanning involves the use of a bath containing an aluminum salt complex, such as a citrate complex, at a pH suitable for tanning. Also, collagen casings may be tanned by treatment with various iron salts or by treatment with nontoxic dialdehydes such as glutaraldehyde. When the casings are tanned or hardened, the tanned casing is generally quite strong and easy to handle during processing, reeling, shirring, packaging etc. In view of the difficulties encountered in the tanning of edible collagen casings there has been some need for the development of a process for the production of casing having satisfactory strength and handling characteristics which does not need to be subjected to a tanning process.

STATEMENT OF OBJECT AND FEATURES OF THE INVENTION

It is therefore one object of this invention to provide a new and improved process for the preparation of edible collagen casings from limed or unlimed hides utilizing a novel coagulation and neutralization treatment producing collagen casings of satisfactory strength and handling properties without the necessity of tanning.

Another object of this invention is to provide a new and improved edible collagen casing prepared from limed or unlimed hides without the necessity of tanning and provided with suitable softeners to provide improved stuffing, linking, and cooking characteristics.

A feature of this invention is the provision of an improved process for preparing edible collagen casings in which the casing is coagulated in a suitable salt coagulation bath and is thoroughly neutralized with strong alkali to yield a product of satisfactory strength and handling properties without tanning.

Another feature of this invention is the provision process for preparing edible collagen casings in which the casing is coagulated and neutralized with strong alkali and finally treated with a plasticizer solution and a fatty monoglyceride or an acetylated fatty monoglyceride softener prior to drying.

Another feature of this invention is the provision of a new and improved edible collagen casing prepared from limed or unlimed hides and coagulated and neutralized with strong alkali without tanning.

Other objects and features of this invention will become apparent from time to time throughout the specification and claims as hereinafter related.

SUMMARY OF THE INVENTION

This invention is based upon the discovery that satisfactory edible collagen casings can be prepared without tanning by subjecting a coagulated collagen casing to substantially complete neutralization with strong alkali. The casing is prepared from limed or unlimed hides. The animal hide is treated to remove blood quickly and is frozen or salt-cured or immediately treated with a lime-containing solution to at least partially dehair the hide. The liming step (of the fresh, frozen, or salt-cured hide) is preferably carried out in less than 48 hours. Alternatively, the hide may be treated with a dilute nontoxic acid after liming to remove the unreacted calcium from the collagen. The hide is then washed, dehaired, ground at a temperature less than 20° C., and swollen with the nontoxic acid at a pH 2.5-3.5. These steps are preferably carried out rapidly, viz, in less than 48 hours, more preferably less than 12 hours.

When the hide, either limed or unlimed, is ground and swollen with a dilute nontoxic acid, a slurry is produced which is extruded through an annular die into a coagulation bath of sodium sulfate or ammonium sulfate, or equivalent coagulating medium, containing sufficient strong alkali, such as sodium hydroxide, potassium hydroxide, quaternary ammonium hydroxides, etc., to coagulate and thoroughly neutralize the extruded tubular casing. Alternatively, part of the neutralization may be carried out in a concentrated salt bath subsequent to the coagulation bath. The neutralization with strong alkali, whether in the coagulation bath or a subsequent bath, must be carried out in a concentrated salt solution, having a salt concentration from about one-fourth saturated to fully saturated. The coagulated and thoroughly neutralized casing does not require further tanning, although in some cases it may be subjected to a tanning solution such as a ferric salt or aluminum salt or glutaraldehyde solution. The casing, preferably without tanning, is washed and finally plasticized with a glycerin solution, which may contain a fatty monoglyceride or an acetylated fatty monoglyceride emulsified therein as a softening agent for the collagen casing. The casing containing the plasticizer and softening agent is then dried, reeled, and eventually shirred and packaged.

The casing which is produced in this process performs better in stuffing, linking, and cooking than casing prepared by prior art techniques.

BRIEF DESCRIPTION OF THE DRAWINGS

The process for preparation of casings in accordance with this invention will be understood more fully by reference to the following description and the accompanying drawings, in which.

DESCRIPTION OF THE PREFERRED EMBODIMENT

Figure 1:
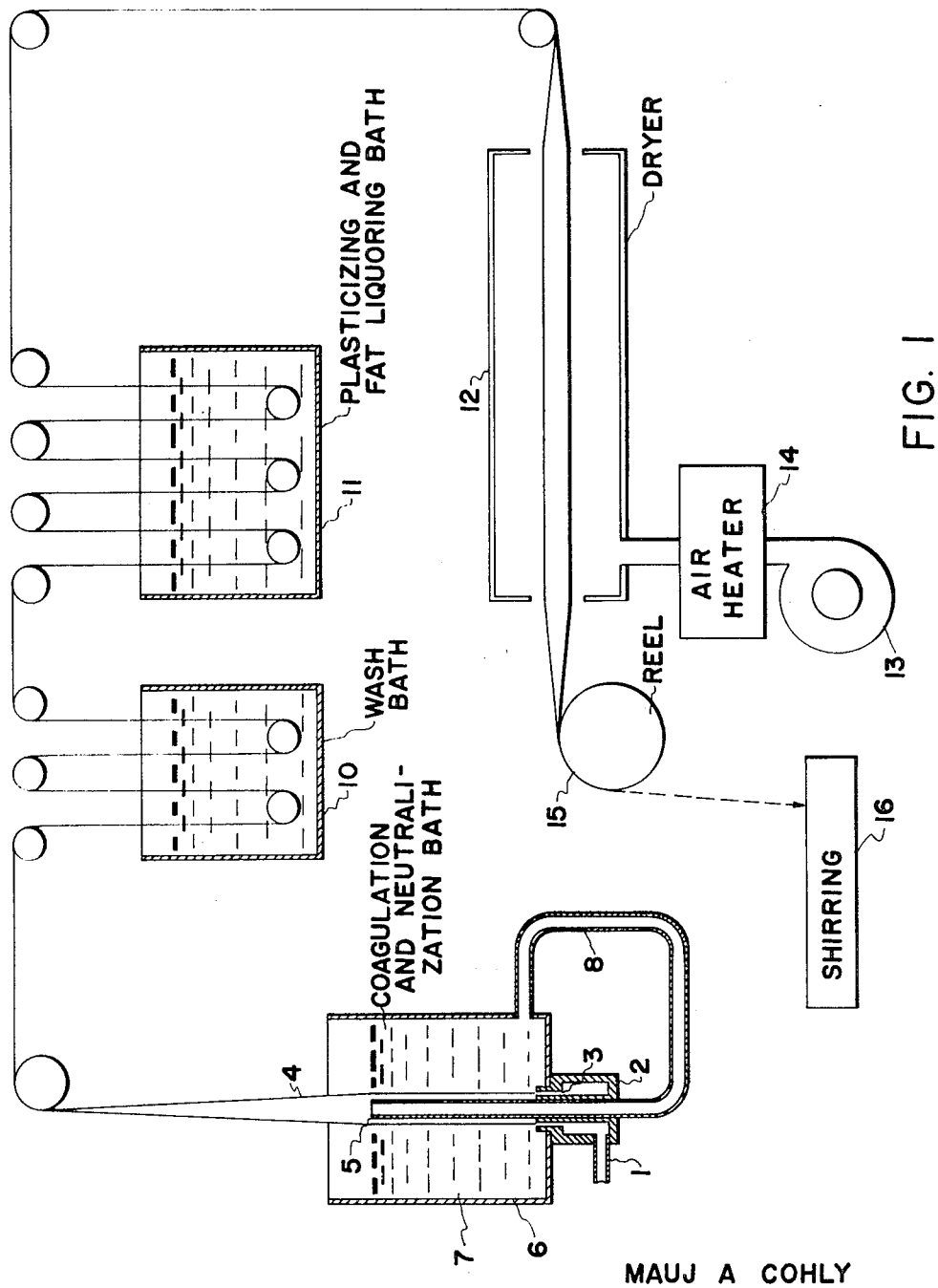
FIG. 1 is a flow diagram illustrating schematically the important steps in the extrusion, coagulation and neutralization, plasticizing, softening, and drying of edible collagen casings.

Collagen tissues which are suitable for preparation of extruded collagen casings are obtainable from hide and tendon, although hide collagen is preferred for casing manufacture. Collagen is formed of a large number of fibers which in turn consist of a much greater number of fibrils of submicroscopic size. Collagen fibrils have a diameter of the order of 10-50 angstroms and lengths ranging from several thousand up to several million angstroms. Recent patents describing the production of edible collagen casings have emphasized the necessity of using collagen source materials which have not been subjected to a liming treatment for the reason that the liming treatment allegedly prevents the bursting of the collagen fibers to release the fibrils which is necessary for the formation of fibrillar films. More recently, it has been found that satisfactory edible collagen casings can be prepared using either limed or unlimed collagen as the source material for the preparation of casing.

If unlimed collagen is to be used in the preparation of an edible collagen casing, the unlimed hide, either fresh, frozen, or salt-cured, is defleshed and the hair and the epidermal layer mechanically removed, e.g. by abrading, scraping, slitting, etc. Enzymatic dehairing of the hide may also be used if desired. The hide is next cut into small pieces and passed through a meat grinder until reduced to a very small size. The ground collagen is then swollen in a solution of an organic acid such as lactic acid or citric acid to produce a slurry having a collagen content in the range from about 2-6 percent, preferably about 3.5-5 percent.

The collagen slurry is extruded through an annular die into a coagulating bath consisting of concentrated aqueous sodium sulfate or ammonium sulfate solution and sufficient strong alkali, such as sodium hydroxide, potassium hydroxide, or quaternary ammonium hydroxides, to neutralize completely the free acid present in the collagen slurry. If desired, part of the neutralization step may be carried out in a separate bath. The slurry is preferably passed through a die having counter rotating parts at the annular opening to orient the collagen fibers and fibrils in opposite directions on the outer and inner portion of the extruded tube to provide a tubular casing of improved strength. The thoroughly neutralized extruded tubular collagen film or casing does not require further hardening or tanning, although, if desired, the casing may be passed into a hardening or tanning bath, preferably consisting of a ferric or aluminum salt in an olated form, an edible nontoxic aldehyde, a vegetable tannin, such as tannic acid, or the like. The casing which has been thoroughly neutralized, either with or without additional tanning or hardening, is then washed and plasticized in a solution of glycerin or equivalent plasticizer containing a fat liquoring material such as a fatty monoglyceride or an acetylated fatty monoglyceride. Finally, the casing is dried, shirred and packaged.

If the collagen to be used in the preparation of an edible casing is derived from limed animal hides, some variation in the above-noted procedure is required. An animal hide is treated to remove the blood quickly and cut into suitable pieces (hide trimmings may also be used) for the subsequent liming treatment. The hide pieces are treated with a suitable lime solution for removal of hair. The lime solution may be simply a saturated solution of lime containing excess solid lime, or may be a solution containing excess solid lime together with sodium sulfhydrate and/or dimethylamine sulfate, or other promoters for the disintegration of hair. After treatment in a liming solution for a period less than 2 days (3-12 hours or less is preferred), the hides are removed and washed. After washing, the hides are split or otherwise mechanically abraded to remove the epidermal layer and any remaining hair. If desired, the hides may be neutralized by treatment with a nontoxic acid, such as lactic acid, at a pH of 2.5-6.5, to form soluble calcium salts. The neutralized hide is washed sufficiently to remove most of the byproduct salts. The hide may be split or mechanically dehaired to remove residual hair and the epidermal layer either before or after the neutralization step. The defleshed and neutralized hide split or corium layer is then cut into small pieces and ground at a temperature less than about 20° C. into a finely divided form and mixed with sufficient water to produce a slurry having a collagen content in the range from about 2-6 percent, preferably about 3.5-5 percent.

The collagen slurry which results from the aforementioned treatment is then mixed with a weak acid such as citric acid or lactic acid to cause the collagen fibers to swell and burst, thus releasing the collagen fibrils and destroying essentially the identity of the individual fibers. The best results are obtained by carrying out the washing, dehairing, grinding and acid swelling of the collagen in less than 48 hours and preferably less than about 12 hours.

The swollen collagen slurry is then extruded through an annular die to produce a thin-walled product for use as sausage casings after tanning and further processing. In order to obtain maximum strength in the product casing, the collagen slurry is preferably extruded though a die having counterrotating inner and outer parts, which is well known in the prior art in the preparation of collagen casings, as shown in Becker U.S. Pat. No. 2,046,541.

Figure 2:
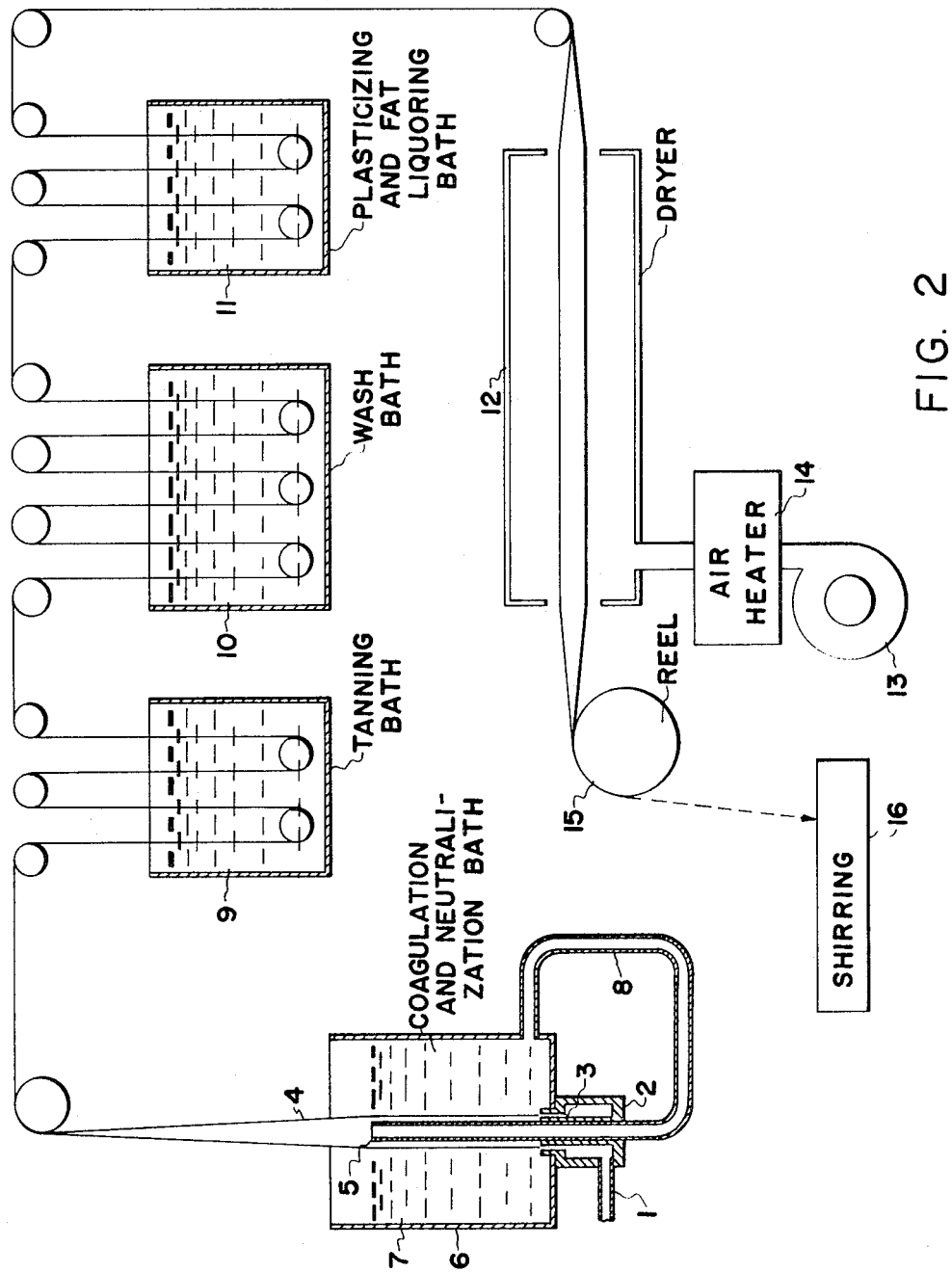
FIG. 2 is a flow diagram illustrating schematically a modification of the process shown in FIG. 1 in which the casing is passed through a tanning solution after coagulation and neutralization.

The collagen slurry is extruded through the die into a coagulating bath consisting of a concentrated (preferably saturated) solution of sodium sulfate or ammonium sulfate. The coagulated collagen tube is treated in a concentrated aqueous salt bath (which may be the coagulation bath or a separate bath following the coagulation bath) having a salt concentration from about one-fourth saturated to fully saturated and containing sufficient, e.g. 0.1–2.0 percent, strong alkali, e.g. sodium hydroxide, potassium hydroxide, or a quaternary ammonium hydroxide, to completely neutralize the free acid in the tube. The treated collagen tube which is thoroughly neutralized has a strength equivalent to an untreated coagulated collagen casing which has been subjected to a normal tanning or hardening process. In some cases, however, the casing may be subjected to a further hardening or tanning treatment in a bath comprising a solution of a ferric salt or an aluminum salt, preferably in an olated form, an edible nontoxic aldehyde, or a vegetable tannin or the like. The casing which has been coagulated and thoroughly neutralized, either with or without further tanning or hardening, is subsequently washed and plasticized in a bath containing both a plasticizer such as glycerin, and a fat liquoring material. The casing which is thus prepared is inflated with air or other gas and passed through a dryer. From the dryer, the casing is either rolled up on reels or is passed on to the shirring machine where it is shirred into short strands as illustrated in FIG. 2 of the drawings. The casing may be shirred directly from the dryer but his is not generally done inasmuch as the shirring machines operate at a much higher speed than the extrusion rate in the process. The casing is preferably stored on reels and then fed separately to shirring machines of the type generally used in the shirring of cellulosic sausage casings. Typically shirring machines are shown in U.S. Pat. Nos. 2,722,714; 2,722,715; 2,723,201 and 3,112,517.

In both of the procedures described above, for preparing edible collagen casing, whether from limed or unlimed hides, the final step in the preparation of the casing prior to drying involves passing the extruded, coagulated, thoroughly neutralized, and washed casing though a plasticizing bath. The plasticizing bath is preferably an aqueous solution of glycerin or similar plasticizing material and contains a softening agent emulsified therein. The softening agent used in the plasticizing bath of this invention consists of about 0.5–5.0 percent wt. of a fatty monoglyceride or an acetylated fatty monoglyceride. The softening agent is emulsified in the aqueous glycerin solution using a suitable emulsifying agent such as sodium dodecyl sulfate or polyoxyethylene (20) sorbitan monopalmitate, or the like. The emulsifier is preferably used at a concentration of about 10 percent of the fatty monoglyceride or acetylated fatty monoglyceride. The monoglycerides which are used are fatty monoglycerides, such as glycerol monostearate, glycerol mono-oleate, glycerol monopalmitate, glycerol mono-laurate, etc., which are sold under the trade name Myverol. Acetylated monoglycerides which may be used are the mono-acetate and di-acetate derivatives of the aforementioned fatty monoglycerides, such as glycerol monostearate diacetate, glycerol monostearate monoacetate, glycerol mono-oleate diacetate, glycerol monopalmitate diacetate, etc., which are sold under the trade name Myvacet.

In FIG. 1 of the drawings, the steps from extrusion through reeling or shirring are illustrated schematically in slightly more detail. The collagen slurry is introduced through inlet conduit 1 into die 2 having an annular die outlet 3 through which casing 4 is extruded. The die 2 has an inner tube 5 which extends upwardly within the extruded casing to remove coagulating bath from within the casing. The die 2 is located at the bottom of container 6 which contains a coagulating bath 7. Coagulating bath 7, which is a concentrated (preferably saturated) solution of ammonium sulfate or sodium sulfate containing a small amount, preferably 0.1–2.0 percent, of a strong alkali, such as sodium hydroxide, potassium hydroxide, or a quaternary ammonium hydroxide, is circulated through conduit 8 from tube 5 for removal of the coagulating bath from inside the extruded casing. Casing which is coagulated and thoroughly neutralized in bath 7 does not require further hardening or tanning.

From coagulating and neutralizing bath 7, the casing passes through a wash bath 10 where byproduct salts and impurities are washed out. The casing is then passed through plasticizing and fat liquoring bath 11 which introduces a small amount of a plasticizer, such as glycerin, and a softening agent, such as fatty monoglyceride or an acetylated fatty monoglyceride, into the casing. From the plasticizing and fat liquoring bath 11, the casing passes through dryer 12 where it is inflated as indicated at 4A and dried with air or other gas circulated by fan or blower 13 through air heater 14.

After leaving dryer 12, the casing may be collapsed and rolled up on reel 15 from which it is subsequently removed for shirring. In an alternate embodiment of this process the casing may be passed directly to a shirring machine shown diagrammatically as 16. In either case, the shirring machine which is used for preparation of shirred strands of casing may be of any suitable type such as the types commonly used in the shirring of regenerated cellulose sausage casings as noted above.

After the casing is shirred into individual short strands for convenience of handling, it is packaged for shipment to the mean packer. Occasionally it may be desired to cure the casing by heating at 60°–80° C. in an atmosphere of 20–50 percent relative humidity for several hours prior to shipment.

In FIG. 2 of the drawings there is illustrated schematically an alternate embodiment of the process shown in FIG. 1 and described above. The process is modified only in that a tanning bath 9 is interposed between coagulation bath 7 and wash bath 10 in the process. Tanning bath 9 consists of an aqueous solution of any suitable nontoxic tanning agent, such as vegetable tannins, nontoxic edible dialdehydes, such as glutaraldehyde, and the aldehydes present in smoke condensates and aluminum and ferric salts, preferably in olated form and rendered partially basic. The process is otherwise identical to that shown in FIG. 1 and described above except that the casing is provided with some additional tanning or hardening by passing through tanning bath 9. Wash bath 10 in FIG. 2 not only removes byproduct salts but also unreacted tanning agent and other impurities before the casing is passed into the plasticizing and fat liquoring bath 11.

Figure 4:
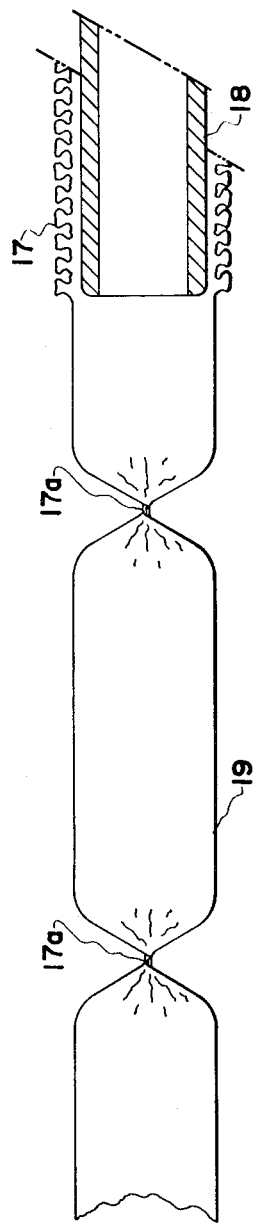
FIG. 4 is a schematic view showing the filling of the casing with sausage meat on an extrusion horn or nozzle and the preparation of sausage links therefrom.

In FIG. 4 stuffing of the casing is illustrated. A strand of edible collagen casing 17, also shown in detail in FIG. 2, is placed on a tubular stuffing horn 18 which is connected to a pressurized source of sausage emulsion (not shown). The sausage emulsion is passed through the stuffing horn 18 into the end of casing 17 and the casing is filled with sausage meat and twisted at suitable intervals, as indicated at 17A, to provide sausage links 19. The links may be severed from each other and packaged in a suitable overwrap following conventional meat packaging techniques. When the sausage is cooked by the consumer, the casing is found to be quite strong and shrinks with the meat during cooking. The casing may be prestuck, if desired, to permit more rapid release of the fat during the cooking of the sausages. The casing which is prepared in this manner and treated with the plasticizer and softening agent in the plasticizing and fat liquoring bath is superior in stuffing, linking, and cooking properties.

The following nonlimiting examples are illustrative of the application of this invention to the preparation of a satisfactory edible collagen casing having improved stuffing, linking, and cooking characteristics.

EXAMPLE 1

In this example, an edible collagen casing is prepared and hardened without the necessity of tanning. The collagen which is used in preparing the edible casing is derived from limed animal hides although unlimed hides may be used with appropriate modification of the process.

Selected animal hides from carcasses certified fit for human consumption, weighing about 65–75 pounds each, are used as the starting material for this process. As soon as possible after flaying and inspection, the hides are washed in a large volume of circulating cool (10° C.) water to remove adhering blood. After washing, the hides are fleshed fresh, without curing, to remove adhering fatty and muscular debris from the flaying operation.

The washed and fleshed hides are then treated in a liming bath containing 6 percent wt. of fresh calcium hydroxide and 1.5 percent wt. of sodium sulfhydrate (the liming bath may contain up to 3 percent dimethylamine sulfate), as solution and/or slurry contained in about 450 percent wt. of water at room temperature (15°–20° C.), all percentages being calculated on the weight of the hide treated. The treatment is carried out for a period of less than 6 hours, sufficient to remove most of the hair from the hide, and the hides are gently agitated from time to time to insure even penetration of the liming liquor.

After liming, the hides are removed from the liming bath and permitted to drain for a period of about one-half hour while suspended. The limed hides are gently squeezed, as between rubber rollers, to remove excess liming liquor. The hides which have been thus limed, drained and squeezed, are then cut or split in the plane of the hide into two approximately equal portions by weight. The upper or outer hide surface contains all of the hair, hair follicles and sebaceous and sudorific glands. The inner or corium layer consists essentially of collagen. The outer or hair-containing layer or split is discarded as unsuitable for use in the preparation of casing but may be used for the formation of leather laminates or coverings.

The corium layer or split is then placed in a tank or vat containing about 4.5 times the hide weight of water at a temperature less than about 15° C. Gentle agitation is used to insure even removal of debris and adhering lime solution and/or slurry. The hides are washed during a period of 20–30 minutes. The washings are removed and the corium splits are resuspended in 4.5 times their weight of cool (15° C.) water. Edible grade lactic acid, suitably diluted at a concentration of 2–4 ounces of 44 percent lactic acid per quart of cool (15° C.) water is added in small portions at 15 minute intervals, with gentle agitation for 5 minutes for each 15 minute period. The liquor is tested for pH before each addition, and end point is regarded at a point when the pH is permanently depressed below 7.0. In general, this requires about 1.5 percent of the 44 percent lactic acid, based on the weight of the corium splits. This treatment is effective to neutralize the excess lime in the corium layer and remove it as a soluble salt. The rate of addition of the lactic acid solution is carefully regulated so that the temperature of the bath is never permitted to rise above 32° C.

The neutralized and delimed corium splits are then removed from the neutralization bath, drained and rinsed in cool (15° C.) water, packed into polyethylene bags which are in turn placed into 50-gallon fiber drums. Dry ice in sufficient quantity is placed above and below the polyethylene bags to chill the prepared collagen and to maintain it below 5° C. during storage and/or shipment prior to comminution and acid swelling operations prior to extrusion. It should be noted, however, that the hides may, if desired, be cut into small pieces or small pieces of scrap hide material may be used in the steps of liming, splitting, and neutralization or deliming.

The delimed corium splits are cut into small square or rectangular sections, e.g. one-fourth to 4 inches on a side, in preparation for grinding. The small pieces of treated hide are converted to a fine pulp by successive passes through a meat grinder. In this grinding operation, sufficient ice is mixed with the hide splits to maintain the temperature below about 20° C. (preferably below about 10° C.). The successive passes through the meat grinder use successively smaller dies, the smallest being about three sixty-fourths inch. At this point, sufficient water is added to the pulp to produce a mixture consisting of about 90 percent water and 10 percent collagen.

The collagen pulp is then treated with sufficient dilute lactic acid (or other dilute or weak acids such as citric or acetic acid may be used) to produce a pH of about 2.5–3.7. The acid is usually added as a dilute solution, e.g. about 0.8–2.0 percent. After thorough mixing, the pulp and acid are stored overnight at a temperature of about 3° C. to swell. At the end of this time, the collagen is swollen and has taken up all of the water in the slurry. The swollen collagen is mixed with sufficient water and acid to maintain the pH of 2.5–3.7, thus producing a thin homogeneous paste consisting of about 4 percent collagen and 1.2 percent lactic acid.

The swollen collagen slurry is passed through a homogenizer to further disperse the fibers and is then filtered to remove any undispersed fiber clumps or other solids contaminants. The paste is generally deaerated by storage under vacuum prior to extrusion. The process, from washing of the limed hide through the acid swelling of the comminuted collagen, is preferably carried out in a period of about 6–12 hours (and generally no longer than 48 hours).

In preparing the collagen slurry for extrusion, the acid deliming step described above may be omitted if the initial liming operation is sufficiently short and the entire operation from start of the liming of the hide through the acid swelling of the comminuted collagen is sufficiently short. Thus, if the initial liming of the hide is a relatively short period, e.g. 3–12 hours, and the hide is immediately thereafter defleshed, split, washed, cut into small pieces, and comminuted, and if the comminuted collagen is immediately subjected to acid swelling, homogenization, and filtering, as described above, it may be possible to eliminate the deliming step.

When unlimed hides are used as the source of collagen in carrying out this process, the hides are subjected to acid or enzymatic unhairing and then defleshed and split, substantially as described above. When unlimed hides are used, they are not subjected to the intermediate deliming step. If a substantial amount of acid is used in the unhairing of the hide, it may be necessary to treat the corium split with sodium bicarbonate to neutralize the excess acid present. The corium split which is obtained from an unlimed hide source is cut into small pieces, ground, acid swollen, homogenized, and filtered, all as described above. Any of the aforementioned procedures for producing a homogenized and filtered collagen slurry for extrusion, whether from unlimed or limed hides, may be used in preparing satisfactory collagen slurries for use in carrying out this invention.

The homogenized and filtered collagen slurry is then pumped under pressure through a counterrotating extrusion die, as previously described, into a first coagulating bath consisting of about 40 percent ammonium sulfate (sodium sulfate can also be used) in water. When the collagen is extruded as a thin-walled tube into this concentration of ammonium sulfate (or sodium sulfate), the collagen fibrils are dehydrated and collapse to form a film which is sufficiently coherent for further processing. The film which is produced in the coagulating bath, however, has no wet strength at all and when passed into water will revert to a paste like material.

After the film is first coagulated in the ammonium sulfate solution, it is then passed into a second coagulating bath consisting of 5 percent ammonium sulfate, 10 percent (about one-fourth saturated) sodium chloride and 0.5 percent sodium hydroxide. From the second coagulation bath, the casing passes through a series of wash baths illustrated diagrammatically as a single wash bath, and then into a final plasticizing bath comprising 5 percent glycerin and 1 percent of a fatty monoglyceride or an acetylated fatty monoglyceride emulsified therein, to provide improved softness and improved cooking characteristics to the finished casing.

From the plasticizing bath, the casing passes through a dryer where it is inflated and dried with the aid of heat air circulated by a fan or blower as previously described. Upon leaving the dryer, the casing is partially rehumidified, rolled up on reels, and finally shirred on a machine similar to the type used in the shirring of regenerated cellulose casings. Alternatively, it is possible (but not desirable) to shirr the casing directly out of the dryer. After the casing is shirred into individual short lengths it is packaged into suitable cartons for delivery to the customer.

The several washing steps in this process are effective to remove essentially all of the reagents used in liming the hide or in other treating steps and leave no measurable residue of toxic or inedible components. The casing produced in this example had a wet break strength of 900 g. as compared with a break strength of about 900–1,000 g. for casing prepared without the sodium hydroxide neutralization step but subjected to a suitable mineral or aldehyde tanning step.

Figure 3:
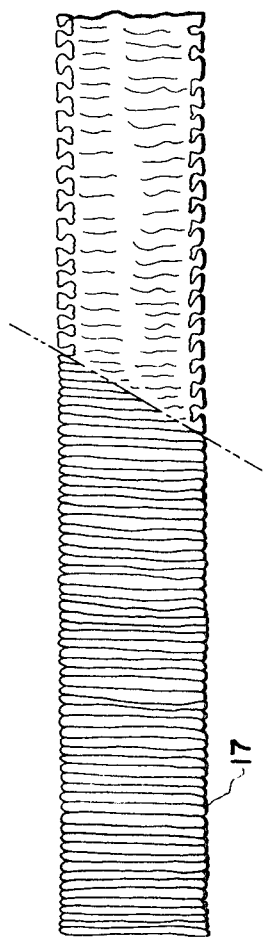
FIG. 3 is an extruded edible collagen casing prepared in accordance with this invention as processed in a shirred form.

When this casing was used in a shirred form as illustrated in FIG. 3 and stuffed with sausage meat and formed into links as shown in FIG. 4, a satisfactory product was obtained. The casing was found to function well in stuffing and was formed easily by a commercial linking machine into the desired sausage links. When the sausages were cooked, the casing was found to shrink with the meat and to release fat cooked out. There was no excessive tendency of the casing to split or stick to the frying pan during cooking.

EXAMPLE 2

A series of experiments were carried out in which the first coagulation bath, consisting of a substantially saturated aqueous solution of ammonium sulfate, was modified by addition of 1.0 percent ammonium hydroxide, and the second coagulation and neutralization bath was changed to a composition of 5 percent ammonium sulfate and 20 percent (about one-half saturated) sodium chloride, in water, with varying levels of sodium hydroxide present, e.g. 0.1 percent, 0.25 percent, 0.5 percent, 1.0 percent, and 2.0 percent, respectively. The other steps in the preparation of the collagen slurry, extrusion of the collagen tube, washing, plasticizing, drying, reeling and shirring of the collagen casing were as described in example 1.

In each of the experiments there was produced casing having a wet strength comparable to mineral tanned or aldehyde tanned casing, which shirred, stuffed, linked, and cooked satisfactorily.

EXAMPLE 3

A collagen slurry, prepared as described in example 1, was extruded into a coagulation and neutralization bath comprising a saturated aqueous solution of ammonium sulfate containing 0.2 percent sodium hydroxide having a pH of 8.0. The extruded casing had a residence time of 5 minutes in the first coagulation and neutralization bath. Next, the coagulated collagen casing was passed through a series of three coagulation and neutralization baths comprising a 14 percent aqueous solution of sodium sulfate containing sufficient sodium hydroxide to yield a pH of 12.0. The alkali content of these baths was sufficient to effect an essentially complete neutralization of acid present in the collagen slurry. After a thorough coagulation and neutralization of the casing, it was then passed through a series of cold water washes at neutral pH and finally through a plasticizing bath comprising glycerin, acetylated fatty monoglyceride, and a small amount of sodium bicarbonate, in water at a pH of about 8.

The casing produced in this example had a wet strength comparable to a mineral tanned or aldehyde tanned casing produced by prior art techniques. After drying and reeling, the casing was found to shirr satisfactorily and in stuffing, linking and cooking tests respond to perform as well as casings prepared in accordance with the prior art.

EXAMPLE 4

In this example the process of example 3 is varied by changing the composition of the initial coagulation bath. The collagen slurry is initially extruded into a coagulation and neutralization bath consisting of an essentially saturated solution of sodium sulfate containing sufficient sodium hydroxide to maintain a pH of about 8.0. The remainder of the coagulation and neutralization bath, wash baths, and plasticizing baths are as described in example 3. The casing produced in this example has a satisfactory wet strength and, after drying, and reeling, is found to shirr, stuff, link, and cook satisfactorily.

From the several examples just described and from other experimental work it has been determined that satisfactory extruded edible collagen casing can be prepared without the use of mineral tanning or aldehyde tanning as has been required in the prior art. Extruded collagen casing and other extruded collagen product or formed collagen product may be prepared by extruding or forming a collagen slurry into a suitable salt coagulation bath and subjecting the coagulated collagen in extruded or formed condition to a thorough neutralization by reaction with alkali such as sodium hydroxide, potassium hydroxide or quaternary ammonium hydroxides (e.g. tetramethyl ammonium hydroxide, tetraethyl ammonium hydroxide, etc.). The neutralization may be carried out by incorporation of a sufficient amount of the alkali (which must be a relatively strong alkali) in the initial coagulating salt bath or by including a smaller amount of the alkali in one or more additional baths containing the coagulating salt. In procedures where the collagen slurry is first extruded or formed in a coagulating bath, such as ammonium sulfate or sodium sulfate, without addition of extra alkali, it is preferred to use a mixture of a coagulating salt such as ammonium sulfate or sodium sulfate with a substantial proportion of sodium chloride or potassium chloride and alkali such as sodium hydroxide, potassium hydroxide or a quaternary ammonium hydroxide in a coagulation and neutralization bath. The residence time of the extruded or formed casing or other collagen product in the coagulation and neutralization baths, wash bath, and plasticizing bath, is the minimum time sufficient to perform the desired function in each of the respective baths. In the coagulation and neutralization bath, the residence time must be sufficient to coagulate and completely neutralize the acid present in the extruded collagen. When the acid present in the extruded collagen is thoroughly neutralized the product has a high wet strength and properties generally approximating those of mineral tanned or animal tanned collagen. The residence time in the various water washes is sufficient to remove all unreacted materials. The residence time in the plasticizing bath is a time sufficient to incorporate a satisfactory amount of the plasticizer and fat liquoring material in the casing or other collagen product.

EXAMPLE 5

In this example, the process is varied by subjecting the coagulated and neutralized extruded collagen casing to an additional tanning step. The tanning is unnecessary to produce a satisfactory casing but in some instances where a still stronger product is required the tanning step may be used.

The process of any of example 1 to 4 may be varied by incorporating an additional tanning step after the first wash following the final coagulation and neutralization step. As a specific example, the process of example 3 is modified by including a tanning bath after the first wash following the last bath containing sodium sulfate and sodium hydroxide. The tanning bath is an aluminum complex prepared by dissolving aluminum sulfate in deionized or softened water and treated with sodium citrate to produce an aluminum salt complex. The aluminum sulfate-citrate complex is then treated with sufficient sodium carbonate to render the complex about two-thirds basic. The olated two-thirds basic aluminum sulfate-citrate complex which is thus formed is used for further tanning or hardening of the casing. When the casing is passed through this bath it is hardened and strengthened further and then is washed prior to entering the plasticizing bath. In carrying out this modification of the process, any suitable tanning bath may be used, such as an olated ferric salt solution, or an aldehyde tanning solution such as dilute glutaraldehyde.

When casing is prepared as described in this example using a tanning step in addition to the thorough coagulation and neutralization, the product which is obtained is substantially stronger than that produced either by the coagulation and neutralization treatment alone or by the mineral tanning or aldehyde tanning alone.

EXAMPLE 6

In this example, there is illustrated the application of the process to the preparation of sheet collagen film.

A collagen slurry prepared as in example 1 is extruded through a thin slit into a coagulation bath consisting of an essentially saturated solution of sodium sulfate or ammonium sulfate and optionally containing a small amount of sodium hydroxide or ammonium hydroxide. The coagulated thin film which is produced is then passed through a coagulation and neutralization bath consisting of sodium sulfate and sodium hydroxide or consisting of a small amount of ammonium sulfate plus a substantial amount of salt such as sodium chloride or potassium chloride and sufficient alkali, such as sodium hydroxide, potassium hydroxide or a quaternary ammonium hydroxide, to thoroughly neutralize the acid remaining in the film.

After the film has been thoroughly neutralized it may be washed and plasticized following the procedure described for FIG. 1 of the flow diagrams. Or it may be passed through a tanning bath containing a suitable mineral or aldehyde tanning agent, such as aluminum or ferric salts or glutaraldehyde, and then washed and passed through a plasticizing bath, as described for the flow diagram shown in FIG. 2. Thin films which are prepared in accordance with this example are satisfactory for packaging food products and are edible packaging materials. Thus, the packaging film may be used to wrap meat or other food products and may be cooked and eaten with the food.

EXAMPLE 7

In this example the application of the process to the production of surgical sutures is illustrated.

A collagen slurry is prepared as described in the introductory portion of example 1 and is extruded through a spinneret or other small diameter orifice into a coagulation and neutralization bath as used in any of the previous examples. The extruded filament is coagulated and neutralized in the bath and may be subjected to tanning as described in connection with the flow diagram shown in FIG. 2. The thoroughly coagulated and neutralized filament, either with or without additional tanning, is washed free of all soluble impurities and then passed through a plasticizing bath and dried and wound on a suitable spool or reel. In preparing sutures in accordance with this invention the rollers over which the filament is fed may be operated at a slowly and progressively increasing speed so that the filament is given a longitudinal stretch which orients the collagen fibrils longitudinally and provides increased strength in the finished suture. The sutures which are prepared in this manner are of sufficient strength and purity to be used for surgical purposes and are readily absorbed by the body. The collagen filaments or sutures may also be extruded in larger size or may be twisted into yarns of a sufficient size and strength for use as a substitute for gut strings in tennis rackets and similar equipment.

We claim:

1. A method of preparing an edible tubular collagen casing which comprises:
    a. extruding an acid-swollen collagen slurry through an annular die into a concentrated salt coagulation bath,
    b. treating the coagulated collagen in a concentrated aqueous salt solution having a concentration from about one-fourth saturated to fully saturated of a concentration sufficient to maintain the integrity and prevent disintegration of the coagulated collagen and containing sufficient strong alkali, not less than about 0.1 percent. The neutralization with strong alkali, whether in the coagulation or a subsequent bath, must be carried out in a concentrated salt solution, having a salt concentration from about one-fourth saturated to fully saturated, to completely neutralize the acid in the coagulated collagen to produce a reconstituted collagen tube having high wet and dry strength without further tanning or hardening treatment, and
    c. washing, plasticizing, and drying the coagulated and neutralized collagen tube to produce a translucent, nonfibrous, edible product.
2. A method in accordance with claim 1 in which the extruded collagen is coagulated and neutralized in the same bath.
3. A method in accordance with claim 1 in which said coagulation bath is a substantially saturated aqueous solution of ammonium sulfate or sodium sulfate and said strong alkali is sodium hydroxide, potassium hydroxide or a quaternary ammonium hydroxide.
4. A method in accordance with claim 1 in which the collagen is coagulated in a substantially saturated aqueous solution of ammonium sulfate or sodium sulfate containing 0.1–2.0 percent sodium hydroxide, potassium hydroxide or a quaternary ammonium hydroxide.
5. A method in accordance with claim 1 in which the extruded collagen is coagulated and neutralized in different baths.
6. A method in accordance with claim 3 in which the collagen is coagulated in a substantially saturated aqueous solution of ammonium sulfate or sodium sulfate and then passed through a neutralization bath comprising a concentrated aqueous salt solution having a salt concentration from about one-fourth saturated to fully saturated and containing 0.1–2.0 percent sodium hydroxide, potassium hydroxide, or a quaternary ammonium hydroxide.
7. A method in accordance with claim 6 in which the neutralization bath contains a small proportion of ammonium sulfate and a large proportion of sodium chloride.
8. A method of producing an untanned reconstituted collagen product of high wet and dry strength which comprises:
    a. extruding an acid swollen collagen slurry into a concentrated salt coagulation bath,
    b. treating the coagulated collagen in a concentrated aqueous salt solution have a concentration from about one-fourth saturated to fully saturated of a concentration sufficient to maintain the integrity and prevent disintegration of the coagulated collagen and containing sufficient strong alkali, not less than about 0.1 percent. The neutralization with strong alkali, whether in the coagulation bath or a subsequent bath, must be carried out in a concentrated salt solution, having a salt concentration from about one-fourth saturated to fully saturated, to completely neutralize the acid in the coagulated collagen to produce a reconstituted collagen product having high wet and dry strength without further tanning or hardening treatment, and
    c. washing, plasticizing, and drying the reconstituted collagen product.

* * * * *

UNITED STATES PATENT OFFICE
CERTIFICATE OF CORRECTION

Patent No. 3,620,775              Dated November 16, 1971

Inventor(s) Mauj A. Cohly, et al

It is certified that error appears in the above-identified patent and that said Letters Patent are hereby corrected as shown below:

On the cover sheet in the ABSTRACT, line 6, "coreium" should read -- corium -- . Column 1, line 29, change "smoke" to read -- smoked -- ; line 70, after "3,425,846", insert a comma. Column 4, line 4, "slitting" should read -- splitting --, Column 5, line 32, change "his" to -- this -- ; line 44, "though" should read -- through -- . Column 9, line 53, after "percent" insert -- (saturated solution at room temperature) --. Column 12, lines 7-11, cancel ". The neutralization with strong alkali, whether in the coagulation or a subsequent bath, must be carried out in a concentrated salt solution, having a salt concentration from about one-fourth saturated to fully saturated" and after the comma, insert -- to maintain a pH of at least 8 -- ; line 51, change "have" to -- having --; line 55, delete ". The neutralization with strong alkali, whether in the coagulation bath or a subsequent bath, must be carried out in a concentrated salt solution, having a salt concentration from about one-fourth saturated to fully saturated" and after the comma, insert -- to maintain a pH of at least 8 -- .

Signed and sealed this 14th day of November 1972.

(SEAL)
Attest:

EDWARD M. FLETCHER, JR.          ROBERT GOTTSCHALK
Attesting Officer                 Commissioner of Patents